(12) United States Patent
Sakai et al.

(10) Patent No.: US 6,764,179 B2
(45) Date of Patent: Jul. 20, 2004

(54) OPHTHALMIC LENS DESIGN METHOD AND RESULTING OPHTHALMIC LENS

(75) Inventors: Yukihisa Sakai, Toyohashi (JP); Yoshihiko Oyama, Kakamigahara (JP)

(73) Assignee: Menicon Co., Ltd., Nagoya (JP)

(*) Notice: Subject to any disclaimer, the term of this patent is extended or adjusted under 35 U.S.C. 154(b) by 25 days.

(21) Appl. No.: 10/157,253

(22) Filed: May 28, 2002

(65) Prior Publication Data

US 2002/0176049 A1 Nov. 28, 2002

(30) Foreign Application Priority Data

May 28, 2001 (JP) ........................................ 2001-159654

(51) Int. Cl.$^7$ ................................................. G02C 7/04
(52) U.S. Cl. ...................................................... 351/177
(58) Field of Search ................................. 351/177, 159, 351/161, 160 R (56) References Cited

U.S. PATENT DOCUMENTS 5,220,359 A * 6/1993 Roffman ..................... 351/177

2002/0071092 A1 * 6/2002 Suzaki et al. ............... 351/159
2002/0196412 A1 * 12/2002 Abitbol ....................... 351/246

FOREIGN PATENT DOCUMENTS

| JP | 60-91327 | 5/1985 |
| JP | 5-181096 | 7/1993 |

* cited by examiner

*Primary Examiner*—Scott J. Sugarman
*Assistant Examiner*—Darryl J. Collins
(74) *Attorney, Agent, or Firm*—Beyer Weaver & Thomas, LLP (57) ABSTRACT

Disclosed is a method of designing an ophthalmic lens including the steps of: (a) determining a preliminary lens shape by preliminary determining a shape of the ophthalmic lens; and (b) varying the preliminary lens shape so as to adjust a position of an image surface at which MTF value is maximized, such that the position of the image surface matches a desired focal length of said ophthalmic lens. A resulting ophthalmic lens constructed according to this method is also disclosed.

13 Claims, 4 Drawing Sheets

OPHTHALMIC LENS DESIGN METHOD AND RESULTING OPHTHALMIC LENS

INCORPORATED BY REFERENCE

The disclosure of Japanese Patent Application No. 2001-159654 filed on May 28, 2001 including the specification, drawings and abstract is incorporated herein by reference in its entirety.

BACKGROUND OF THE INVENTION

1. Field of the Invention

The present invention relates to a novel method of designing ophthalmic lenses including a contact lens, an intraocular lens and a spectacle lens, which permits a high-precise and quick design of a lens shape capable of providing a desired refractive power. The present invention relates also to an ophthalmic lens provided according to this method.

2. Description of the Related Art

Conventionally, contact lenses, intraocular lenses, spectacle lenses, and various other ophthalmic lenses have been provided in order to correct or otherwise improve the refractive abnormalities of the human eyes. An important issue concerning these lenses is to precisely establish a refractive power needed for the eyes worn with these lenses.

An refractive power of an ophthalmic lens can basically be obtained according to known equations based on Snell's Law, while taking into account of configurations of the front and back surfaces of the lens, lens thickness, and the refractive index of the lens material.

However, an inherent problem of optical lenses, i e., effects of aberrations makes it practically impossible to provide a desired refractive power to every light rays passing through the various points on a lens. When the lens is designed and shaped on the basis of a specific refractive power existing at a certain point on the lens surface, the lens is very likely to fail in providing the desired refractive with consideration for the total range of the optical zone.

In practical cases of single-focus ophthalmic lenses for correcting myopia, hyperopia, and the like, for example, a front and a back lens surface are usually provided with a spherical shape having a single radius of curvature. This arrangement may cause significant spherical aberration, particularly when such a single-focus ophthalmic lens has high refractive power. This makes it difficult to obtain the desired refractive power with high accuracy. In multifocal lenses for presbyopia and the like, a plurality of concentric or otherwise structured segmented optical areas may be formed inside the optical zone. Such a multifocal lens is provided with a complex surface configuration in which surfaces of the segmented optical areas have spherical shapes with mutually different radii of curvature. This complex surface configuration of the multifocal lens causes an increase of spherical aberration as viewed over the entire range of the optical zone, and generates interference between the segmented optical areas that makes it more difficult to stably obtain the desired refractive power as long as the plurality of segmented optical areas are considered together. As to contact lenses, typical tendency in designing back surfaces of the lenses affects both single-focus and multifocal lenses. Namely, the back surface of a contact lens is generally provided with a relatively small radius of curvature in conformity with a cornea of a wearer, whereby the effect of spherical aberration becomes even more significant, making it difficult to obtain the desired refractive power with high precision in the entire optical zone.

To cope with these drawbacks, one method has been proposed wherein ray tracing is performed at numerous points in the optical zone to trace and analyze paths of light rays through the optical zone, and an optimal lens surface configuration is designed on the basis of analysis results to accurately establish the desired refractive power, for example. However, this method requires complex and time-consuming calculations for analyzing the paths of the light rays at the numerous points by the ray tracing, and suffers from difficulty in determining the overall configuration of the lens surface on the basis of the mutually independent analysis results obtained for the numerous points in the optical zone, as well. Therefore, the proposed method is not always effective.

Another method has also been proposed wherein MTF (modulation transfer function) is used to evaluate the effect of aberration in an ophthalmic lens whose shape is designed on the basis of general optical equations derived from Snell's Laws. However, such a conventional method merely involves a use of MTF as a simple aberration evaluation means, and fails to propose an effective design method to provide ophthalmic lenses capable of generating desired refractive powers.

SUMMARY OF THE INVENTION

It is therefore one object of this invention to provide a novel method of designing an ophthalmic lens in which a desired refractive power is given to an optical zone of the lens with ease and high precision, while taking into account of the effect of aberration.

It is another object of this invention to provide an ophthalmic lens whose optical zone is designed to provide a desired refractive power with high precision.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

(1) A method of designing an ophthalmic lens comprising the steps of: (a) defining a preliminary lens shape by preliminary determining a shape of the ophthalmic lens; and (b) varying the preliminary lens shape so as to adjust a peak position of MTF in relation to an image surface distance concerning the preliminary lens shape such that the peak position of the MTF conforms to a desired focal length of the ophthalmic lens.

According to the method of this mode of the invention, Modulation Transfer Function or MTF can be used as an index of an actual refractive power, and the preliminary lens shape is varied on the basis of the MTF measurements so as to establish a desired refractive power of the ophthalmic lens. This is unlike conventional lens design method wherein the MTF is simply utilized as a measure for evaluating aberrations. Described in detail, the present method utilizes MTF data computed concerning the preliminary lens shape, and detects an image distance or an image surface position where the MTF has a peak value. This image surface position is referred to as the "peak position of the MTF". An attention paid to the difference in distance between the peak position of the MTF (i.e., the image surface distance) and a desired focal position (i e., the desired focal length) of the ophthalmic lens has revealed that the difference between these distances provides indexes in the form of direction and magnitude, which are useful for varying the preliminary lens shape desirably. That is, the present method has been developed on the basis of a novel technical finding and concept that varying of the preliminary lens shape on the basis of these indexes makes it possible to define the desired refractive power of the ophthalmic lens with high accuracy. In the present method, accordingly, the peak position of the MTF is finally equal to the desired focal position, i.e., the desired focal length, thereby establishing an excellent actual refractive power of an obtained ophthalmic lens with high accuracy. As well known in the art, MTF describes the reduction in contrast of a pattern of lines, black and white, arranged at regular intervals, which is imaged through a lens. The MTF is given as a function of a spatial frequency, and is usually demonstrated on a graph in which the spatial frequency is used to enter the horizontal axis. In the present invention, however, the MTF is preferably demonstrated on a graph in which the refractive power is used to enter the horizontal axis, while fixing the spatial frequency at a predetermined value, whereby the MTF is recognized as a function of the refractive power.

The ophthalmic lens design method according to this mode of the present invention does not need as many as ray tracing or a similar calculations do the conventional lens design methods according to the ray tracing technique, and does not need as frequent as lens-shape varying processes do the conventional lens design methods in which the MTF is simply utilized for evaluating lens aberrations. Therefore, the present ophthalmic lens design method is capable of designing a shape of the ophthalmic lens that generates the desired refractive power with efficiency and accuracy.

Preferably, the following steps may be incorporated into the present method according to the mode (1) of the invention, for detecting the peak position of the MTF. This preferred mode will be described as a mode (2). (2) A method according to the above-described mode (1) of the invention further comprising the steps of: (c) determining an area to be designed within an optical zone of the ophthalmic lens with the preliminary lens shape; (d) determining a spatial frequency for the area to be designed; (e) determining a plurality of calculating positions within a predetermined range of the image surface distance in which a desired focal position of the ophthalmic lens is located, for the area to be designed; and (f) calculating the MTF by using the spatial frequency with respect to each of the plurality of calculating positions.

The preliminary lens shape may be determined according to known optics equations. For instance, the general formula for a thick lens in a paraxial region can calculate a radius of curvature of one lens surface, with the substitution of the desired refractive power, while being on the basis of a radius of curvature of the other lens surface, a thickness of a central portion of the lens positioned on an optical axis and a refractive index of a lens material. The term "optical zone" should be interpreted to mean an area having an ability to desirably correct a refractive power of a wearer's eye. This optical zone is entirely or partially defined as the area to be designed. The term "image surface distance from the ophthalmic lens" should be interpreted to represent an image position on the optical axis of the lens, in which light transmitted through the ophthalmic lens is imaged. This image position may be given as a distance form the ophthalmic lens as measured along a central axis of the ophthalmic lens, for example. The predetermined range of the image surface distance is preferably defined around the desired focal position of the ophthalmic lens such that the predetermined range extends from the desired focal position by a predetermined distance in opposite directions of the optical axis, thereby permitting a correction of deviation of a focal position as measured in the preliminary lens shape in both directions of the optical axis. In order to permit a detection or estimation of the peak position of the MTF, a suitable number of the calculating positions may be specified at suitable positions within the predetermined range of the image surface distance. Further, the spatial frequency for use in the calculation of the MTF may desirably be determined while taking into account of optical characteristics required for the ophthalmic lens. For the sake of facilitation of operation and interpretation of the obtained data, it is effective to conform the spatial frequency for the MTF calculation to a spatial frequency used in an inspection of a quality of the obtained ophthalmic lens. A variety of manners may be adoptable to vary the preliminary lens shape to adjust the obtained peak position of the MTF. For instance, the preliminary lens shape may be varied by adding to the preliminary lens shape a desired amount of lens power (diopter) enough to provide a refractive power that makes it possible to compensate the difference between the obtained peak position of the MTF and the desired focal position of the ophthalmic lens. Alternatively, the preliminary lens shape may be varied according to empirical formulas obtained by a great number of data collected in advance.

If a resultant amount of variation of the peak position of the MTF is well apparent form the executed variation of the preliminary lens shape, it is not essential to re-execute the MTF calculation on the basis of the varied preliminary lens shape, and reevaluate the relationship between the peak position of the re-obtained MTF and the desired focal position of the ophthalmic lens. Optionally, a combination of the processes of calculating the MTF and varying the preliminary lens shape is repeated several times so that the resultant preliminary lens shape provides the peak position of the MTF, which conforms to the desired focal position or focal length of the ophthalmic lens.

(3) A method according to the above-indicated mode (1) or (2), wherein the peak position of the MTF is adjusted by varying at least one of a front lens surface, a back lens surface and a lens thickness in the preliminary lens shape. In the ophthalmic lens design method according to this mode of the invention, the preliminary lens shape may be modified on the basis of the spatial direction and magnitude by which the peak position of the MTF and the desired focal position of the ophthalmic lens are shifted relative to each other, while taking into account of various kinds of data or wearers information. This permits a modification of the preliminary lens shape with a total view of the entire lens shape. Alternatively, the preliminary lens shape may be similarly modified, while taking into account of a specific part of the preliminary lens shape. This permits an effective re-defining of the lens shape on the basis of the MTF data.

In the latter case where the peak position of the MTF is adjusted based only on the lens shape of the specific part, it is possible to vary only one of the front and back surfaces in the preliminary lens shape, on the condition that the other one of the front and back surfaces in the preliminary lens shape is provided with a standard shape, while the lens thickness in the preliminary lens shape is determined according to strength, durability and/or other properties required for the ophthalmic lens, and is determined to have a standard dimension at a given position, such as a optical center of the lens. Consequently, the present method makes it possible to vary the preliminary lens shape with further enhanced facility and rapidity. Particularly, the present method is suitably adoptable for designing a contact lens, since it is effective for the contact lens to adopt a back surface whose shape is fixedly determined corresponding to a shape of a cornea of the wearer. In this case, for example, the shape of the front lens surface is varied with standard values given to the shape of the back lens surface and a lens thickness measured at a given position, whereby the peak position of the MTF is effectively adjusted.

(4) A method according to the above modes (1)–(3), wherein the preliminary lens shape is varied by adjusting at least one of a radius of curvature and an aspheric coefficient of at least one of a front lens surface and a back lens surface. According to the ophthalmic lens design method of this mode of the invention, the radius of curvature of the front and/or back lens surfaces is/are changed as needed, whereby the peak position of the MTF can be adjusted on the optical axis of the lens. Also, the aspheric coefficient of the front and/or back lens surfaces is/are changed as needed, whereby aberrations or other drawbacks of the lens can be suitably adjusted. Thus, the present ophthalmic lens design method makes it possible to adjust a refractive power or other optical characteristics of the lens with high accuracy.

(5) A method according to any one of the above-indicated modes (2)–(4), wherein the method is applied for designing a multifocal lens in which the optical zone includes a plurality of segmented optical areas having different focal lengths, said method further comprising the steps of: determining a plurality of said predetermined range of the image surface distance for a plurality of desired focal positions, respectively; calculating the MTF by using the spatial frequency so as to detects a plurality of the peak positions of the MTF corresponding to said plurality of said predetermined ranges of the image surface distance; and varying the preliminary lens shape such that the plurality of the peak positions of the MTF conform to the plurality of desired focal positions, respectively, within corresponding ones of the plurality of the predetermined ranges of said image surface distance. According to this mode of the invention, the ophthalmic lens design method of the present invention is effectively adaptable for designing a multifocal lens, which should be interpreted to include lenses having two or more segmented optical areas, e.g., a bi-focal lens. This method makes it enable to design with high accuracy the shape of the multifocal lens so as to provide desired refractive powers at respective segmented optical areas, where the all segmented optical areas are considered together in the process of calculating MTF, and interference between the plurality of segmented optical areas are taken into account It may be possible to independently perform ray tracing for each segmented optical area, and then to independently design each segmented optical area on the basis of the calculated MTF value as a result of the corresponding ray tracing. However, the present method makes it possible to calculate the MTF with the all segmented optical areas considered together, and to design simultaneously the all segmented optical areas on the basis of the plurality of MTF peak positions obtained in the MTF calculation. Thus, the present method permits more easier and rapider calculation of the MTF, while assuring a high accurate multifocal lens-shape design where the interface between the plurality of segmented optical areas are taken into consideration.

(6) A method according to any one of the above-indicated modes (1)–(5), wherein the optical zone includes a toric lens area provided with both of a spherical lens power and a cylindrical lens power that have desired focal positions, respectively, said toric lens area generating two of said peak positions of the MTF, and wherein the preliminary lens shape is varied in said toric lens area so that the two MTF peak positions of the toric lens area conforms to the desired focal positions of the spherical lens power and the cylindrical lens power, respectively. The ophthalmic lens design method according to this mode of the invention permits a desired lens design in which interaction between the spatial lend power and the cylindrical lens power taken into consideration, making it possible to precisely design desired refractive powers of the spherical lens and the cylindrical lens.

(7) A method according to any one of the above-indicated modes (2)–(6), further comprising the step of imaginary disposing an aplanatic lens having a given constant power in close contact with one of a front and a back lens surface of the ophthalmic lens with the preliminary lens shape, after the preliminary lens shape is determined, wherein the MTF is calculated with respect to the ophthalmic lens with the preliminary lens shape in which aplanatic lens is attached. According to this ophthalmic lens design method of this mode of the invention, the range of the image surface distance can be set to be closer to the ophthalmic lens with the preliminary lens shape and to be small in size, even in the case where the ophthalmic lens with the preliminary lens shape has a refractive power whose value is close to zero. That is, the present method is capable of limiting the required numbers of the MTF calculating positions and facilitating the required calculating process, while assuring high accuracy in designing the desired refractive power. If one of the opposite lens surfaces in the preliminary lens shape has the standard shape as defined in the above-indicated mode (2), for example, the present method is desirably performed on the assumption that the aplanatic lens is held in close contact with the corresponding lens surface having the standard shape. This arrangement makes sense theoretically, and makes it easier to calculate the lens shape.

(8) A method according to any one of the above-indicated modes (2)–(7), further comprising the steps of: calculating a center of gravity of total values of the MTF as measured within the predetermined range of the image surface distance, and defining a position of the center of gravity in relation to the image surface distance as a center-of-gravity image surface position, wherein the center-of-gravity image surface position is utilized as the peak position of the MTF, and the preliminary lens shape is varied so that the center-of-gravity image surface position conforms to the desired focal length of the ophthalmic lens. The ophthalmic lens design method according to this mode of the invention is capable of not only facilitating the detection of the peak position of the MTF, but also minimizing variation of errors of the position, thus improving reliability of the obtained design values. Further, the present design method is able to ensure a high accuracy in the resultant lens design effectively, even if the number of calculating positions for the MTF is made small, thereby improving operation efficiency with the help of the reduced amount of required calculation load. Since the center-of-gravity image surface position is utilized as the peak position of the MTF, it is effectively prevented or avoided that unexpected error signals. Affect the determination of the peak position. A variety of manners may be adoptable for specifying the center of gravity of the total values of the MTF in relation to image surface distance. For instance, the predetermined range of the image surface distance is defined around a desired center-of-gravity image surface position, so as to equally extend opposite sides of the desired center-of-gravity image surface position, and the plurality of calculating positions for calculating the MTF are determined within the predetermined range at regular intervals for calculating the MTF. The calculated MTF values obtained at respective calculating positions are processed by means of weight mean or alternatively integration, thereby specifying the center of gravity of the total MTF values in relation to the image surface distance.

(9) A method according to any one of the above-indicated modes (2)–(8), wherein the spatial frequency comprises a spatial frequency V expressed in a unit of length, and said spatial frequency V is converted to a spatial frequency U expressed in a unit of angle on the basis of a formula: U=V×(1000/D)×(π/180), in which a desired refractive power D in said area to be designed is utilized, while the MTF is calculated by using the spatial frequency U. According to the ophthalmic lens design method of this mode of the invention, calculation errors due to the variation of the refractive power set in the preliminary lens shape can be eliminated or reduced, thus improving reliability of the obtained design value.

(10) A method according to any one of the above-indicated modes (2)–(9), wherein the predetermined range of the image surface distance is held within a range of a desired refractive power D of the ophthalmic lens ±1 diopter, for calculating the MTF. According to the ophthalmic lens method of this mode of the invention, a suitable range of the image surface distance, i.e., positions for image surfaces involved in calculating the MTF is effectively specified, permitting an effective lens design with a reduced amount of calculations. For an ophthalmic lens having a general configuration, preferably, the predetermined range of the image surface distance can be held within a range of the desired refractive power D±0.5 diopter, in view of generally expected errors, further easing a burden of the MTF calculation.

(11) A method according to any one of the above-indicated modes (2)–(10), wherein the step for calculating the MTF further includes the steps of: splitting the area to be designed into segments having a constant area, projecting a plurality of light rays on the area to be designed such that the plurality of light rays pass through substantially central portions of the segments, respectively, while being arranged with a pitch of 0.001–1 mm, and performing ray tracing with respect to the plurality of light rays. The ophthalmic lens design method according to this mode of the invention, makes it possible to reduce the amount of calculations required to obtain MTF value at each positions, while assuring a desired accuracy in the obtained MTF, resulting in a further ease of the burden of the calculation. A specific value of the pitch of the light rays may be suitably determined with the lens shape, the radius of curvature, and the lens diameter taken into consideration. Preferably, a pitch of 0.05–0.1 mm is adopted for use in a general lens, thus achieving both of a desired accuracy in lens designing and alleviation of the burden of calculation.

(12) A method according to any one of the above-indicated modes (2)–(11), wherein the area to be designed is specified as a circular area with a diameter of 2–10 mm. This method also permits the alleviation of the calculation burden while assuring the desired accuracy in the lens design. The same effects may be otherwise achieved by defining the area to be designed to amount to 5–95% of an entire area of the optical zone.

(13) An ophthalmic lens, characterized in that a lens shape of the ophthalmic lens is determined according to a method as defined in any one of the above-indicated modes (1)–(12). The ophthalmic lens fabricated according to the present invention can be designed to generate precisely a desired refractive power with the effect of aberration taken into account. Therefore, the ophthalmic lens of the present invention is capable establishing a required correction of a refractive power of a wearer's eye, with high precision.

BRIEF DESCRIPTION OF THE DRAWINGS

The foregoing and/or optional objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
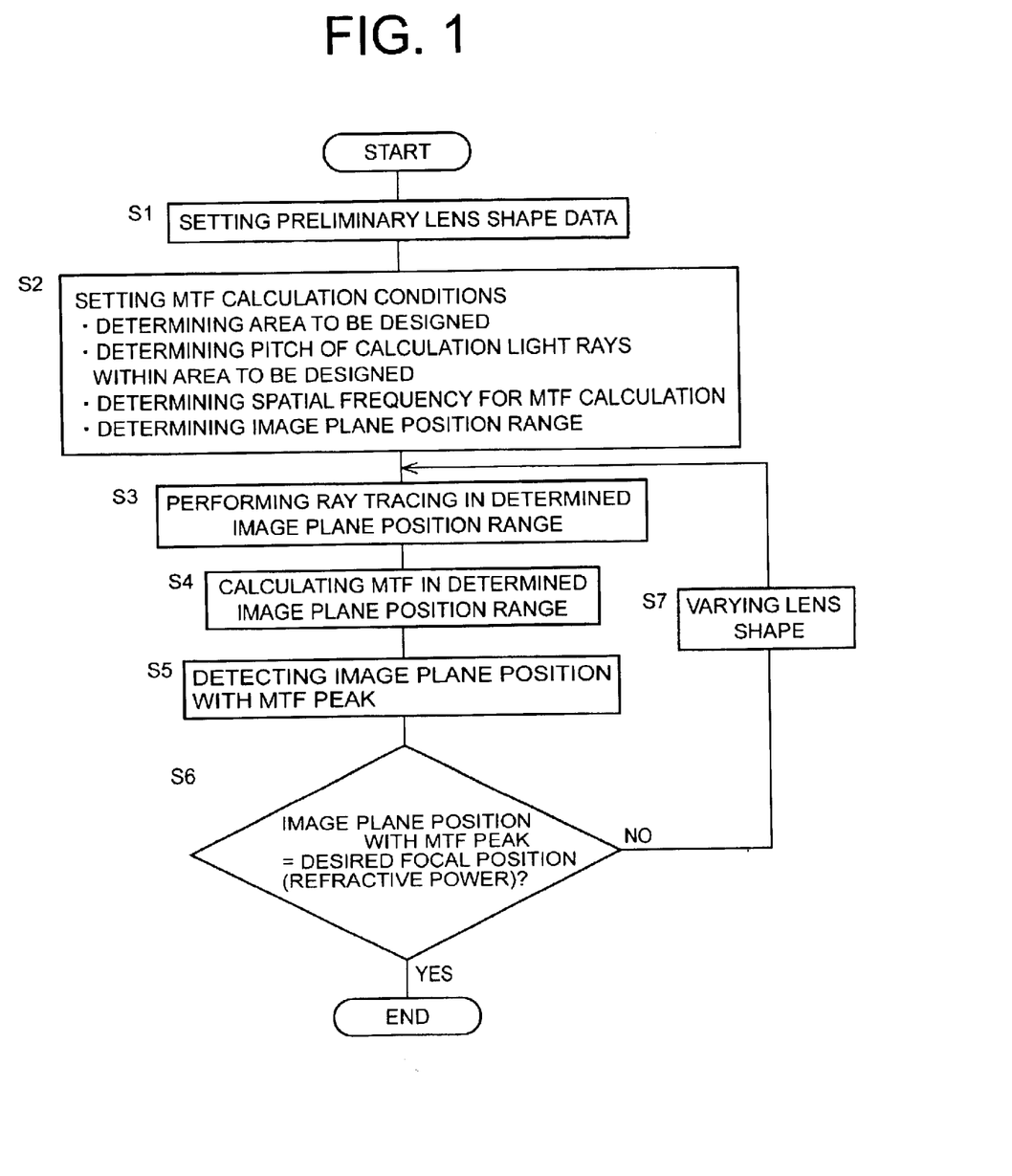
FIG. 1 is a flow chart illustrating a processing routine according to one embodiment of a method of designing an ophthalmic lens of the present invention.

Referring to FIG. 1, a processing routine according to one embodiment of a method of designing an ophthalmic lens of the present invention is depicted as a flowchart. A case in which a shape of an ophthalmic lens in the form of a contact lens is designed will be described with reference to the flowchart of FIG. 1. The following method of the present embodiment can be effectively implemented using a suitably programmed general-purpose computer, for example.

When the design of the shape of the contact lens is started, step S1 is executed to set data associated with a preliminary lens shape, and to determine the preliminary lens shape on the basis of these data. The data associated with the preliminary lens shape may be of the type that permits a preliminary and specific determination of at least the shape of an optical zone, which should be interpreted to mean a lens area capable of optically correcting the refractive abnormalities of a lens wearer. More specifically, the data associated with the preliminary lens shape include information about a required refractive power, a base curve (radius of curvature of back surface) that corresponds to the shape of a cornea of the lens wearer, a position and a size of the optical zone with consideration for wearing conditions, the selection of single and multiple focal positions, a value of a cylinder power, and the like. A specific preliminary lens shape is imaginary or preliminary created on the basis of the data associated with the preliminary lens shape. In the case of a contact lens, a known general formula for a thick lens in a paraxial region is utilized, for example, so that a desired preliminary lens shape can be clearly created by specifying the data associated with the preliminary lens as described above.

Subsequently, step S2 is executed to set MTF calculation conditions for the contact lens whose preliminary lens shape was created in step S1.

It should be noted that this step for setting the MTF calculation conditions includes a process for determining an area to be designed by MTF calculations (hereinafter referred to as the "MTF-design area") within the range of optical zone. While the overall optical zone of the contact lens may possibly be specified as the MTF-design area, it is desirable to specify a suitable part of the optical zone as the MTF-design area, since the designation of the overall optical zone makes the MTF calculations complex. In the case of a single-focus lens, for example, it is effective to specify a circular area with a diameter of 2–10 mm on an optical axis of the lens as the MTF-design area. As well known in the art, MTF is usually given as a function of spatial frequency in which the reduction in contrast of a pattern of lines, black and white projected through the lens is represented as the number of periods of brightness and darkness (i.e., pairs of the lines, black and white) per 1 millimeter. MTF is represented by the following formula. "(Maximum brightness before passage through lens—Minimum brightness before passage through lens)/Maximum brightness after passage through lens—Minimum brightness after passage through lens)."

Figure 2:
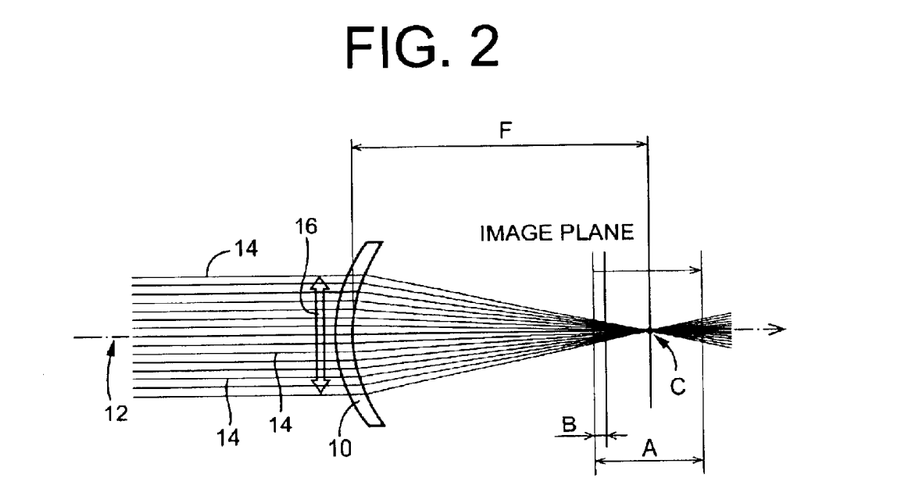
FIG. 2 is a view useful for explaining an example of computing process for measuring Modulation Transfer Function (MTF) adoptable in the lens design method of the invention.
Figure 3:
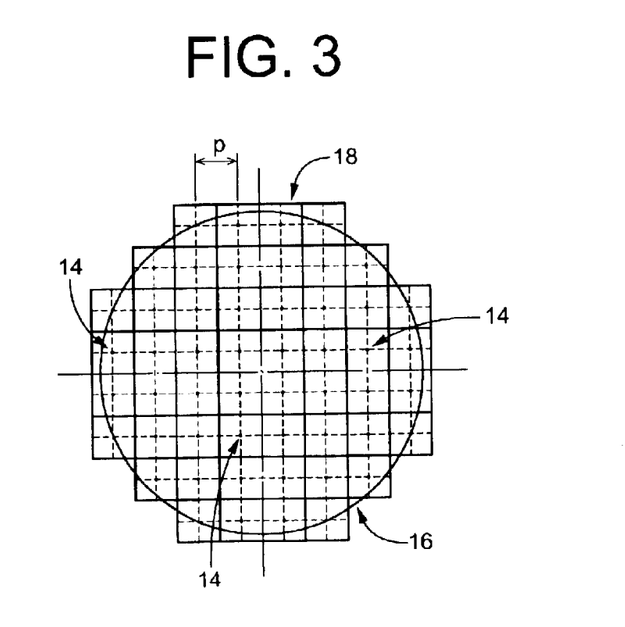
FIG. 3 is a view useful for explaining an example of pitch or other arrangements of incident light rays on a lens adoptable upon the measurement of MTF of FIG. 2.

Also, step S2 for setting the MTF calculation conditions includes a process for determining a pitch of computational light rays, which are used for ray tracing during the MTF calculations, and which are projected on and transmitted through the MTF-design area. As shown in FIG. 2, numerous light rays 14 parallel to an optical axis 12 of a preliminary lens 10 having the determined preliminary lens shape may preferably be adopted for such computational light rays. These numerous light rays 14 are arranged to pass through respective positions on the preliminary lens 10 according to the following manner. First, as shown in FIG. 3, the MTF-design area shown as a MTF-design area 16 is imaginary divided by means of an appropriate mesh 18 into a plurality of domains with an uniform area, and then the numerous computational light rays 14 are arranged to strike central portions (e.g., positions of centers of gravity) of the plurality of domains, respectively. As a result, the positions at which the computational light rays 14 are projected on the preliminary lens 10 can be arranged at a regular pitch P within the MTF-design area 16. Preferably, the pitch P of the computational light rays 14 is fixedly set within a range of P=0.001–1 mm in order to reduce the complexity of calculations while preserving the desired accuracy in the calculations.

Step S2 for setting the MTF calculation conditions further includes a process for determining the spatial frequency to be adopted during the MTF calculations. As described above, the spatial frequency expresses the number of periods of brightness and darkness per 1 millimeter, and is used as a parameter for the MTF calculation. Preferably, the spatial frequency is determined to conform to the spatial frequency employed in an inspection device used for an inspection of product quality or the like, since this makes it possible to integrate design and inspection data and to facilitate to administer or handle these data. In order to reduce or otherwise minimize the nonuniformity of calculation accuracy due to differences in the refractive powers set to the preliminary lens 10, the spatial frequency is preferably determined to have a value obtained by converting a regular spatial frequency (V-value) to a spatial frequency expressed in terms of angle (U-value) on the basis of the following formula. In the formula, D is a desired refractive power of the MTF-design area 16, and π is the ratio of the circumference of a circle to its diameter.

$$U=V\times(1000/D)\times(\pi/180)$$

The spatial frequency (U-value) expressed in terms of angle and obtained by the above-indicated formula may preferably be 50–5 cyc/deg, and more particularly 30–15 cyc/deg. In the case where the inspection device employs 30 cyc/deg for the spatial frequency expressed in terms of angle, for example, the spatial frequency is preferably set to the same spatial frequency U expressed in terms of angle, i.e., 30 cyc/deg.

Yet further, step S2 for setting the MTF calculation conditions includes a process for determining a range of image surface distance in the form of a range A of positions for image surfaces involved in calculating the MTF. Unlike the conventional method as described above, the present embodiment utilizes the MTF for designing the desired refractive power of the ophthalmic lens rather than for evaluating aberrations of the ophthalmic lens. For this reason, it is ineffective to determine MTF variations using a parameter in the form of a distance relative to the preliminary lens 10 on the optical axis, which is measured by using the spatial position of the preliminary lens 10 as a reference position, for example. In this case, a range in a space where the MTF variation corresponding to the relative position (distance) from the preliminary lens 10 should be recognized, may be determined as the range A of the positions for the image surfaces. Preferably, the range A of positions for the image surface may be determined so as to extend in opposite directions of the optical axis by the substantially same distance from a point (C) that matches the desired refractive power (focal length) of the ophthalmic lens, e.g., the contact lens in this embodiment, in view of a possible deviation of the refractive power to the positive and negative sides due to aberrations or the like. Generally, the refractive power (diopter): P (D) of an ophthalmic lens can be converted to the focal length (mm): F with the help of the following formula.

$$P(D)=1/(F/1000)$$

After the conditions for the MTF designing has been set at step S2 in the above-described manner, step S3 is then executed to perform a known ray tracing for tracing the paths of the computational light rays 14 at a plurality of calculation points located inside the range A of positions for the image surfaces, and coordinate positions of each computational light ray 14 are calculated within a plane orthogonal to the optical axis at corresponding position of the image surface. The tracing of the light rays 14 can be executed by performing calculations using an equation based on Snell's Laws, in which the material (refractive index) of the preliminary lens 10, the shapes of the front and back surfaces of the lens, and other suitable parameters are taken into account.

As shown in FIG. 2, the positions of the image surfaces may be determined in advance at a plurality of locations spaced apart from one another at predetermined regular calculation intervals B from one end to the other end of the range A of positions for the image surfaces in the direction of the optical axis. The calculating intervals B may be determined based on experiments or the like with reference to the range A of positions for the image surfaces, in an attempt to make it possible to detect with sufficient precision positions of the image surfaces where the MTF values reach their peak, which will be described later in detail.

Figure 4:
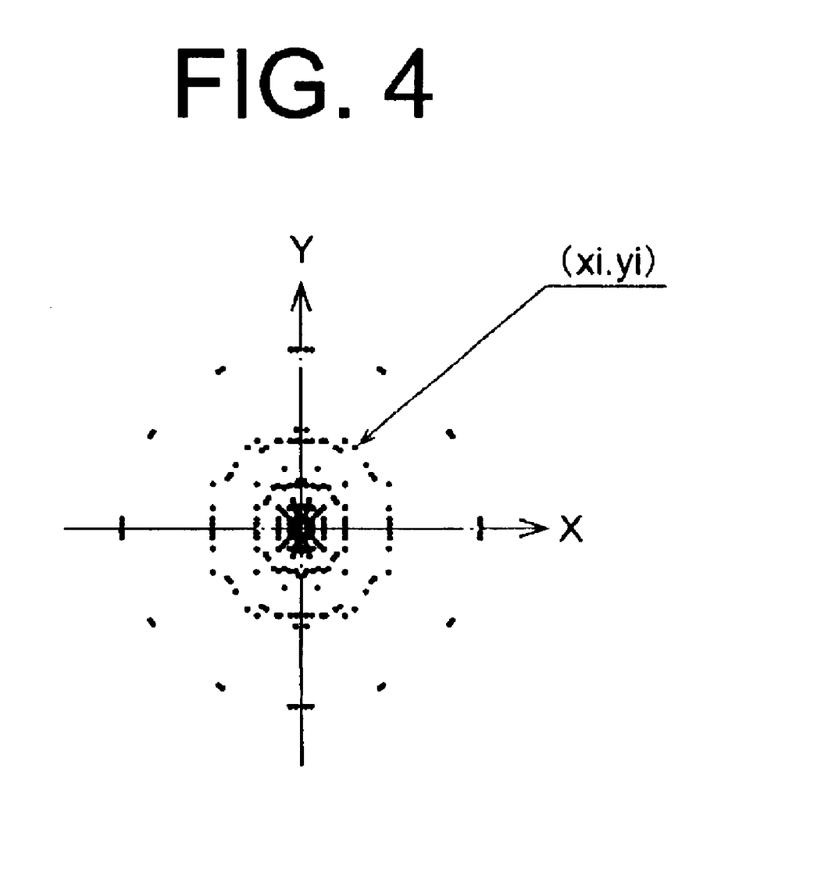
FIG. 4 is a plot of an example of measurement of ray tracing of the paths of the incident light rays on a two-dimensional coordinate by way of example, which is adoptable upon the measurement of MTF of FIG. 2.

FIG. 4 shows an example of a distribution pattern of light rays within one plane orthogonal to the optical axis at one position of the image surface. In the subsequent step S4, the MTF in the preliminary lens 10 at each position of the image surface is calculated on the basis of the distribution patterns obtained at each positions of the image surface obtained in step S3. Described in detail, the MTF may be calculated using the following formula (1), for example. In the formula (1), u is the spatial frequency, N is the number of computational light rays 14, and y is the coordinate value of each computational light ray 14 within a plane at a position corresponding to the image surface.

$$MTF = |A(u)| \qquad (1)$$

$$A(u) = (1/N) \sum_{i=1}^{N} (\cos 2\pi u y_i)$$

Figure 5:
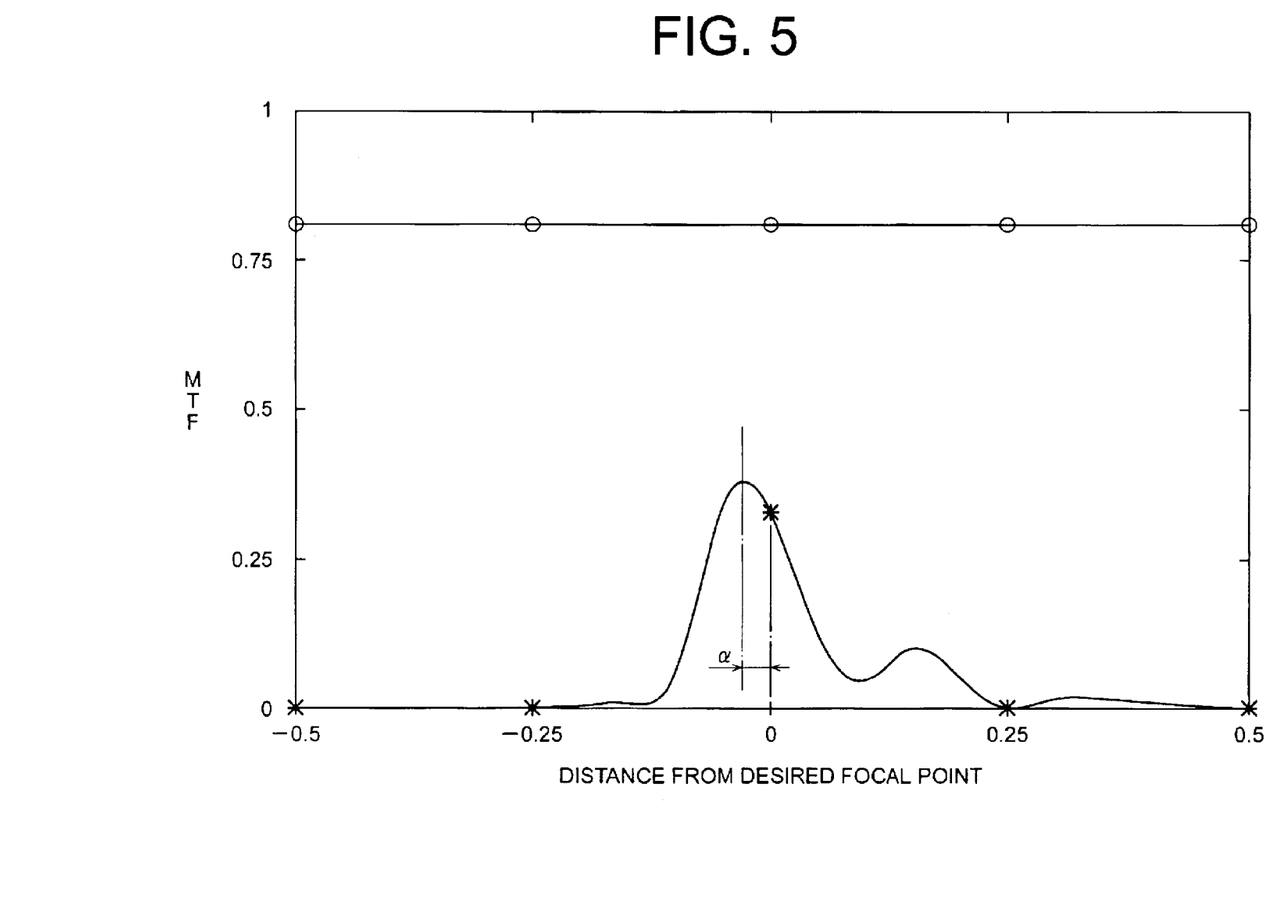
FIG. 5 is a graph depicting an example of measurement of MTF obtained according to the process of FIG. 2.

Referring back to FIG. 1, once the MTF is calculated at step S4 for each position of the image surface in accordance with the above-described manner, step S5 is then executed to search the position(s) of the image surface(s) at which the MTF value(s) reach their peak, on the basis of the obtained data. The position of the image surface can be easily searched by using, for example, a graph that depicts the MTF values and has refractive power plotted on a coordinate axis, or a graph that depicts the MTF values and has the focal length plotted on a coordinate axis, as shown in FIG. 5. Alternatively, the positions at which the MTF values reach their peak may, for example, be determined on the basis of positions of centers of gravity in these graphs, which are obtained by integrating these graphs, or other possible manners.

Subsequently, step S6 is executed to compare the desired focal position of the ophthalmic lens with the position of the image surface having the peak value of the MTF calculated in step S5, and then to determine whether the two are equal to each other. For instance, the determination may be performed by a procedure in which a permissible interval in which the two can be considered equal is established in advance, and the two are considered to be equal to each other if the difference between the position of the image surface having the peak value of the MTF and the desired focal position of the ophthalmic lens falls within the permissible interval.

If an affirmative decision is made in step S6, namely, if it is concluded that the position of the image surface at which the MTF reaches the peak is equal to the desired focal position of the ophthalmic lens as a result of the determination made in step S6, then one cycle of process routine for designing the ophthalmic lens shape is terminated. Consequently, the preliminary lens shape has been varied into a desired shape for the ophthalmic lens, which permits to give a desired refractive power to the ophthalmic lens.

If a negative decision is made in step S6, namely, if it is concluded as a result of the determination made in step S6 that the position of the image surface at which the MTF reaches the peak is different from the desired focal position of the ophthalmic lens, then step S7 is executed to add a required variation to the preliminary lens shape. After the lens-shape change in step S7 is completed, an operation flow goes back to step S3 to re-execute steps S3, S4 and S5 in the same manner as described above. The MTF values are calculated again according to the steps S3, S4 and S5, and then it is determined at step S6 whether the varied preliminary lens shape is acceptable. That is, the series of processes from step S7, i.e., varying of the shape of the preliminary lens shape to step S5, i.e., evaluation of the varied preliminary lens shape, is repeatedly executed until the MTF values become suitable for obtaining the affirmative decision in step S6. Consequently, a desired shape of an ophthalmic lens capable of providing a desired refractive power is thereby obtained.

The preliminary lens shape may be modified in step S7 such that the position of the image surface having the peak value of the MTF, which is obtained in accordance with steps S3–S5, is changed so as to approximately coincide with the desired focal position of the ophthalmic lens, on the basis of the direction and magnitude by which the desired focal position of the ophthalmic lens is shifted relative to the position of the image surface having the peak value of the MTF. FIG. 5 shows a specific case where the position of the image surface at which the MTF reaches the peak is shifted by α diopter in minus direction relative to the desired focal position of the ophthalmic lens, by way of example. In this case, the preliminary lens shape is adjusted so that a lens power capable of shifting the focal position by α millimeters in the plus direction is added to the preliminary lens 10. In the case of a single-focus contact lens with a standard back surface and a spherical front surface, for example, the preliminary lens shape may be adjusted by varying or modifying the radius of curvature of the front lens surface and adjusting the spherical lens power. In addition to the adjustment of the lens power, the calculated MTF values may also be utilized for adjusting the aberration or the like of the ophthalmic lens. Namely, it is possible to improve the aberrations by monitoring the calculated MTF values and adjusting their peak values. These operations may be carried out by modifying the value of the aspherical coefficient (conic constant), for example, if the lens surface is designed as an aspherical configuration composed of a rotor obtained by rotating a conical curve about the optical axis.

The specific procedures involved in varying the preliminary lens shape as described above can be performed automatically by selecting in advance a processing formula from among theoretical formulas based on Snell's Laws, empirical formulas based on experiments, and the like, and setting the selected formulas in a suitable calculation program readable through a general computer.

Consequently, the lens shape determined in accordance with the above-described technique of the present embodiment allows the ophthalmic lens to have the desired lens power on the basis of the actual refractive power obtained with consideration for the effect of aberration or the like. Therefore, the method of designing the ophthalmic lens according to the present embodiment is capable of sophisticatedly providing required optical characteristics tailored to the needs of each individual wearer.

While the presently preferred embodiment of the invention has been described above in detail for illustrative purpose only, it is to be understood that the invention is not limited to the details of the illustrated embodiment, but may be otherwise embodied.

For instance, it may be possible to adopt an arrangement in which a step for determining the need for an aplanatic lens is added after the data related to the shape of the preliminary lens have been determined in step S1 but before the MTF calculation conditions are established in step S2 of the flowchart of FIG. 1. In this arrangement, an aplanatic lens having specific power is imaginary bonded to one of the lens surfaces, preferably to the back lens surface as a standard lens surface, as needed. In the case where the desired ophthalmic lens has low refractive power, light passing through the lens and converging on the optical axis is prone to have a relatively low inclination. This causes increase in the range A of positions for the image surfaces involved in the calculation of the MTF and in the number of the positions for which the MTF calculation is needed, and is more likely to involve complex operations. To cope with the problem inherent in this case, an arrangement may preferably adopted, in which the calculation of the MTF values or other operations are performed provided that an aplanatic lens having +50 diopters or another predetermined fixed refractive power is imaginary bonded to the lens surface. This arrangement makes it possible to simplify the operations and speed up the processing of the MTF calculations.

The principle of the present invention may be applicable to various kinds of multifocal lenses, including multifocal lenses with concentric annular lens shapes such as those disclosed in JP-A-60-91327 and other documents and multifocal lenses with aspherical lens shapes such as those disclosed in JP-A-5-181096 or other documents. Likewise, the principle of the present invention may be applicable to toric lenses having cylindrical lens powers, segmented lenses whose optical zones are disposed eccentrically in relation to the geometric lens centers, and other contact lenses having various lens surface shapes. These contact lenses may also have a prism ballast structure, as needed.

In addition, the present invention may be applicable to intraocular lenses, spectacle lenses, and other lenses as well as the contact lenses described above. The present invention is not limited in any way in terms of application by the materials or other properties of these lenses.

It is also to be understood that the present invention may be embodied with various other changes, modifications and improvements, which may occur to those skilled in the art, without departing from the spirit and scope of the invention defined in the following claims.

What is claimed is:

1. A method of designing an ophthalmic lens comprising the steps of:
    determining a preliminary lens shape by preliminary determining a shape of said ophthalmic lens; and
    varying said preliminary lens shape so as to adjust a peak position of MTF in relation to an image surface distance concerning said preliminary lens shape such that said peak position of said MTF conforms to a desired focal length of said ophthalmic lens,
    wherein, for detecting said peak position of said MTF in relation to said image surface distance concerning said preliminary lens shape, the method further comprises the steps of:
    determining an area to be designed within an optical zone of said ophthalmic lens with said preliminary lens shape;
    determining a spatial frequency for said area to be designed;
    determining a plurality of calculating positions within a predetermined range of said image surface distance in which a desired focal position of said ophthalmic lens is located, for said area to be designed; and
    calculating said MTF by using said spatial frequency with respect to each of said plurality of calculating positions.

2. A method according to claim 1, wherein said peak position of said MTF is adjusted by varying at least one of a front lens surface, a back lens surface and a lens thickness in said preliminary lens shape.

3. A method according to claim 1, wherein said preliminary lens shape is varied by adjusting at last one of a radius of curvature and an aspheric coefficient of at least one of a front lens surface and a back lens surface.

4. A method according to claim 1, wherein said method is applied for designing a multifocal lens in which said optical zone includes a plurality of segmented optical areas having different focal lengths, said method further comprising the steps of:
    determining a plurality of said predetermined range of said image surface distance for a plurality of desired focal positions, respectively;
    calculating the MTF by using the spatial frequency so as to detects a plurality of said peak positions of said MTF corresponding to said plurality of said predetermined ranges of said image surface distance; and
    varying said preliminary lens shape such that said plurality of said peak positions of said MTF conform to said plurality of desired focal positions, respectively, within corresponding ones of the plurality of the predetermined ranges of said image surface distance.

5. A method according to claim 1, wherein said optical zone includes a toric lens area provided with both of a spherical lens power and a cylindrical lens power that have desired focal positions, respectively, said tone lens area generating two peak positions of said MTF, and wherein said preliminary lens shape is varied in said tonic lens area so that said two MTF peak positions of said toric lens area conform to said desired focal positions of said spherical lens power and said cylindrical lens power, respectively.

6. A method according to claim 1, further comprising the step of: imaginary disposing an aplanatic lens having a given constant power in close contact with one of a front and a back lens surface of said ophthalmic lens with said preliminary lens shape, after said preliminary lens shape is defined, wherein said MTF is calculated with respect to said ophthalmic lens with said preliminary lens shape in which aplanatic lens is attached.

7. A method according to claim 1, further comprising the step of: calculating a center of gravity of total values of said MTF as measured within said predetermined range of said image surface distance, and defining a position of said center of gravity in relation to said image surface distance as a center-of-gravity image surface position, wherein said center-of-gravity image surface position is utilized as said peak position of said MTF, and said preliminary lens shape is varied so that said center-of-gravity image surface position conforms to said desired focal length of said ophthalmic lens.

8. A method according to claim 1, wherein said spatial frequency comprises a spatial frequency V expressed in a unit of length, and said spatial frequency V is converted to a spatial frequency U expressed in a unit of angle on the basis of a formula: $U=V\times(1000/D)\times(\pi/180)$, in which a desired refractive power D in said area to be designed is utilized, while said MTF is calculated by using said spatial frequency U.

9. A method according to claim 1, wherein said predetermined range of said image surface distance is held within a range of a desired refractive power D of said ophthalmic lens and ±1 diopter, for calculating said MTF.

10. A method according to claim 1, further comprising, wherein said step for calculating said MTF further includes the steps of:
    splitting said area to be designed into segments having a constant area,
    projecting a plurality of light rays on said area to be designed such that said plurality of light rays pass through substantially central portions of said segments, respectively, while being arranged with a pitch of 0.001–1 mm, and performing ray tracing with respect to said plurality of light rays.

11. A method according to claim 1, wherein said area to be designed is specified as a circular area with a diameter of 2–10 mm.

12. A method according to claim 1, wherein said area to be designed amounts to 5–95% of an entire area of said optical zone.

13. An ophthalmic lens having a lens shape designed according to a method of designing said ophthalmic lens comprising the steps of:

defining a preliminary lens shape by preliminary determining a shape of said ophthalmic lens; and varying said preliminary lens shape so as to adjust a MTF peak position in relation to an image surface distance concerning said preliminary lens shape such that said peak position of said MTF conforms to a desired focal length of said ophthalmic lens wherein, for detecting said peak position of said MTF in relation to said image surface distance concerning said preliminary lens shape, the method further comprises the steps of:

determining an area to be designed within an optical zone of said ophthalmic lens with said preliminary lens shape;

determining a spatial frequency for said area to be designed;

determining a plurality of calculating positions within a predetermined range of said image surface distance in which a desired focal position of said ophthalmic lens is located, for said area to be designed; and calculating said MTF by using said spatial frequency with respect to each of said plurality of calculating positions.

* * * * *